United States Patent [19]

McCray et al.

[11] 4,040,471
[45] Aug. 9, 1977

[54] METHOD OF MAKING OR REPAIRING AND SECURING LUGS AND TRUNNION MEMBERS TO INGOT MOLDS

[75] Inventors: Walter A. McCray, Berea; Charles L. Smith, Salem, both of Ohio

[73] Assignee: Hilti Aktiengesellschaft, Schaan, Liechtenstein

[21] Appl. No.: 584,298

[22] Filed: June 6, 1975

[51] Int. Cl.² .................... B22D 19/10; B23K 23/00
[52] U.S. Cl. ................................ 164/92; 29/401 A; 29/401 F; 164/53; 164/98
[58] Field of Search ............... 164/53, 92, DIG. 12, 164/9, 98, 349, 374; 228/241; 29/401 R, 401 A, 401 E, 402, 401 F, 530; 249/174

[56] References Cited
U.S. PATENT DOCUMENTS

| 1,043,977 | 11/1912 | Smith | 164/374 X |
| 2,445,583 | 7/1948 | Moroco | 164/92 |
| 2,957,214 | 10/1960 | Kuharski | 164/DIG. 12 |
| 3,206,154 | 9/1965 | Demaison | 164/374 X |

Primary Examiner—Ronald J. Shore
Assistant Examiner—Gus T. Hampilos
Attorney, Agent, or Firm—Toren, McGeady and Stanger

[57] ABSTRACT

A method for making or repairing lugs and trunnion members for ingot molds by forming a casting space or cavity corresponding to the shape of the lug or trunnion member on the side of the ingot mold where the member is to be secured, forming a casting material feeding chamber above the casting cavity, introducing a predetermined amount of an alumino thermic mixture to the welding chamber and reacting said alumino thermic mixture whereby the molten metal produced from such reaction feeds into and fills the casting cavity and upon cooling forms the desired lug or trunnion. The apparatus for carrying out the process comprising a welding chamber composed of a lower casting space or cavity and an upper casting material feeding chamber is also disclosed.

8 Claims, 10 Drawing Figures

METHOD OF MAKING OR REPAIRING AND SECURING LUGS AND TRUNNION MEMBERS TO INGOT MOLDS

BACKGROUND OF THE INVENTION

1. Field of the Invention

This invention relates to methods and apparatus for manufacturing or repairing lug, trunnion, or other protruding members, attached to ingot molds. More particularly, this invention relates to a method for welding new or replacement lugs or trunnion members onto ingot molds used in the steel industry.

2. Description of the Prior Art

Various types of molds for preparation of steel ingots are conventionally used in steel mills. For example, various types of big end down molds, such as, the open top and bottle top molds are known, as are various types of big end up molds, e.g., open bottom, closed bottom and plugged bottom. Such molds generally have different types of members protruding from the sides thereof for purposes of either lifting, rotating or maneuvering the mold. Typically, for example, such protruding members take the forms of either lifting lugs or turning trunnions. Essentially, these protruding members may be defined as "handles" for the steel ingot molds and they are generally used for maneuvering the molds in the yards, on the mold trains, and in the process of stripping the cast ingot from the mold.

Ordinarily, these "handles" are cast into the mold at the iron foundary where the molds are initially manufactured and generally occur in pairs, on opposite side walls, either at the top and/or the bottom of the mold, depending on the nature of the particular steel making operation wherein the mold is to be used.

Such lugs and trunnions vary in size and shape according to the customs or needs of the particular steel making operation and the weight and bulk of these members are determined by the size and weight of the mold itself and weight of the steel poured into them. For example, an average lug might be 10 inches wide, 14 inches long and 8 inches high and rectangular in shape.

If such a lug is cast into the top center of one of the side walls of an ingot mold, its height may taper from 3 inches of the very top to a final height of 8 inches at the bottom. The form of the lug is generally determined by efforts to conserve metal and weight, to provide strength and to provide some type of lip on the member for purposes of handling by the overhead cranes generally utilized for such purposes in steel mills.

Steel ingot molds are subject to severe treatment in steel mills and complete breakage of lugs or large portions thereof is frequent. Generally, the lugs or protruding members are essentially torn from the mold either leaving no remaining protruding portion or a small broken portion or stump of the original lug or trunnion.

Very often, this renders a relatively expensive ingot mold completely useless inasmuch as it cannot be handled and maneuvered. If the mold has been damaged while it is empty, it is usually set aside to be destroyed at a later time. However, if a lug has been torn from the ingot mold while trying to strip the ingot, it is usually destroyed immediately in order to recover the ingot as soon as possible.

In either event, and particularly in the United States, such broken lugs, trunnions and other protruding members, constitute a great economic disadvantage.

Efforts at repairing such molds have generally been unsuccessful since the repaired lug must possess essentially the same strength as the new lug and conventional securing procedures do not produce a sufficiently strong attachment of the new lug to the ingot mold. Also, such processes have generally required relatively expensive equipment and have not resulted in sufficient savings to warrant their use in steel mills.

SUMMARY OF THE INVENTION

Applicants have discovered a novel method for manufacturing and securing protruding members, such as, lugs, trunnions and the like, on ingot molds. This method is particularly useful inasmuch as it can be carried out on the premises of a steel mill and can be used to repair lugs and trunnions which have been broken from steel molds. Consequently, by virtue of the present method and apparatus, ingot molds which would otherwise have to be disposed of can be recovered for use in the steel mill.

Additionally, with the present invention, it is possible to repair molds which still contain an ingot thereby allowing recovery of the ingot.

More particularly, the method of the present invention comprises placing the ingot mold in a horizontal position with the side bearing the broken protruding member, i.e., lug or trunnion, in an upward or uppermost position and constructing or placing a welding chamber about the broken portion. The casting chamber is composed of a lower casting cavity or chamber and an upper casting material feed chamber. The casting space has a shape corresponding to the shape of the protruding member to be manufactured and has an opening in the bottom thereof in communication with the area of the ingot to which the protruding member is to be secured. It also possesses an opening in the top which forms a top entrance to the casting space. Located directly above and in communication with the casting space is a casting material feeding chamber which has an upright funnel shape, with a smaller bottom opening which is in registration with the top entrance of the casting space. The welding chamber may also possess outer supporting walls and an inner wall generally composed of a refractory material.

An alumino thermic material is then placed into the casting space and a portion of the casting material feeding chamber. The amount of alumino thermic material utilized is that amount required to produce an amount of weld metal sufficient to form the lug or trunnion member. Thereafter, the alumino thermic mixture is ignited whereupon weld metal is formed which, by gravity, travels to the bottom of the welding chamber, i.e., the casting space, and fills the casting space. Upon cooling, a strong protruding member having the shape of the casting space, is obtained.

By utilizing the apparatus process of the present invention, protruding members can be easily repaired or replaced with the resulting economic advantages with respect to the reuse of the ingot molds.

DESCRIPTION OF THE PREFERRED EMBODIMENT

As noted hereinabove, the presently claimed invention can be used to produce various types of protruding members on the sides of ingot molds. While generally, the following discussion will refer primarily to the replacement or repairing of a broken protruding member, and in particular, a lug member, it is understood that the process is equally applicable to any other type of protruding member on an ingot mold, such as, for example, a turning trunnion.

Additionally, the following discussion pertains to a lug which has only been partially broken, leaving a stump portion. However, the process and apparatus described can be used for a protruding member which has been broken off flush with the side of the mold without leaving a stump.

Also, it is equally possible that the presently claimed invention will be used to produce lugs on brand new molds. Even so, the procedure used and the apparatus used would be the same.

Figure 1:
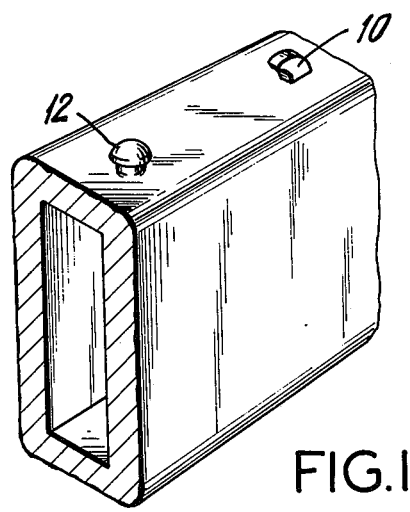
FIG. 1 is a section in perspective of an ingot mold.

Referring now to the drawings, and particularly, FIG. 1, a partial perspective view of a big end down open bottom ingot mold conventionally used in steel manufacturing is shown lying on its side. This mold for purposes of illustration carries a lug member designated as 10 and a turning trunnion designated as 12. As can be seen, each of these members protrudes from the side wall of the ingot mold.

Figure 2:
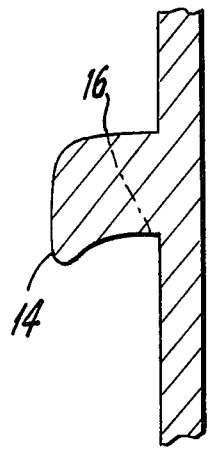
FIG. 2 is a partial cross-sectional view of the side of an ingot mold illustrating a lug member.

FIG. 2 shows a partial cross-sectional view of the sides of an ingot mold showing lug member 14 and depicting the general shape of the lug member. While lug members generally take varying types of shapes depending on the particular type of ingot mold used and the purpose for which it is used, in the illustration, the lug member has a downwardly pointing outer portion for facilitating securement of a retaining hook from a crane onto the ingot mold and subsequent lifting. Also shown is a dotted line 16 which, for purposes of the present discussion, will be the line of breakage of the lug.

Figure 3:
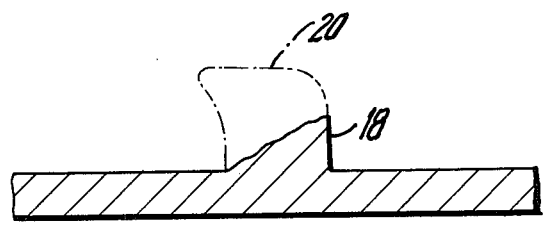
FIG. 3 is a partial cross-sectional view of the side of an ingot mold illustrating a broken lug member.

FIG. 3 shows a partial cross-sectional view of the side of the ingot mold wherein the lug portion has now been broken to leave a stump 18. The missing portion of the lug is shown by the dotted line 20.

It is now desired, in view of the breakage of the lug to produce a new, equivalent lug, on stump 18 which will possess the shape and strength of the original lug member.

Generally, before such a lug repair is made, the entire ingot mold would be inspected to make certain that there are no other non-repairable flaws, such as, vertical cracks on the outside or inside walls that would make the mold unsuitable for use. Obviously, if the mold possesses defects other than the broken lug member, repair of the lug member would be unwarranted since the mold would still be unusable.

Assuming that the mold is a proper candidate for repair, it is placed on its side and positioned so that the area of the side of the ingot mold where the log is to be located, is substantially horizontal and uppermost, for example, as shown in FIG. 1. This surface should be cleaned by chipping and/or brushing away any broken pieces of iron or rust on the fractured face of stump 18 which might weaken the bond of the new lug portion to be secured thereto.

At this time, it is helpful to measure the volume of a similar undamaged lug so that the amount of cast iron necessary to fill the volume can be computed. The same is done for the damaged lug and the difference in volume is, of course, the amount of cast iron required.

After the above preparations, a lug welding chamber is formed on the uppermost side of the ingot mold. This is accomplished by first building a wall 22 about the lug which is spaced apart from the lug such that the broken lug is located approximately in the center of the chamber formed by the wall.

The space 24 by the wall from the broken lug portion will generally be about equal to ½ cross-sectional diameter of the lug although greater or smaller distances can be used and are not critical. Typically, for example, space 24 may be about 7 – 8 inches.

Typically, the wall 22 may be in the form of a box constructed around the lug using ⅜ inch or ½ inch steel plate. The box may be in the form of a square and while not shown in FIG. 4, surrounds all sides of the lug. The chamber defined by the wall 22 is open at the top.

When the walls of the casting chamber are made from steel plate, it is conventional to secure the walls to the side of the ingot by tack welding. It is also possible to use several sheets to produce the height of the wall with the sheets being tack-welded together. Typically, the wall might be about 15 inches high and 30 inches long.

Figure 4:
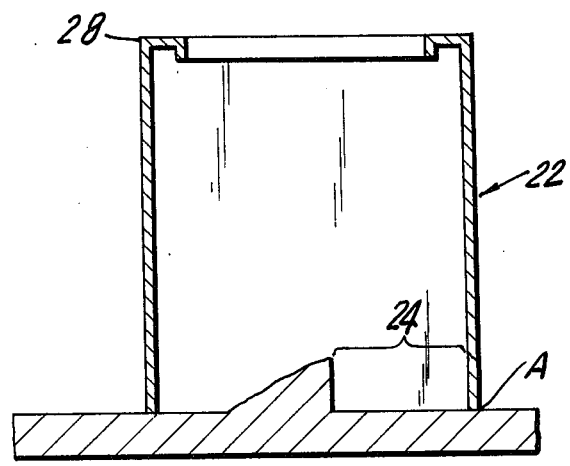
FIGS. 4, 5, 6, 7, 8, 9, and 10, are sequential illustrations of the process and apparatus in accordance with the present invention.

As further shown in FIG. 4, the top of wall 22 possesses an inwardly and downwardly pointing lip 28, the purposes of which will become clear from the following discussion.

Figure 5:
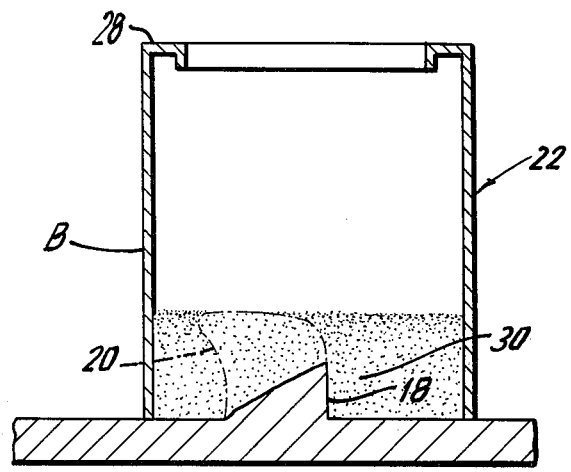

After the erection of wall 22, and as shown in FIG. 5, the bottom portion of the chamber is filled with a refractory material which is in particulate form. The refractory material is designated as 30 and it is placed into space 24 and above and around the broken lug portion 18 to a height B which is equivalent to the height of the lug to be formed. Dotted line 20 is inserted so as to indicate the relationship of the height of the packed refractory material to the height of the lug to be formed.

The refractory material utilized may be any type of molding sand, such as, foundry sand, or any packable refractory material which undergoes low shrinkage on heating, such as, conventional ramming compounds.

Typically, assuming that the final lug to be formed is about 8 inches high, the sand would be packed to a depth of 8 inches.

Figure 6:
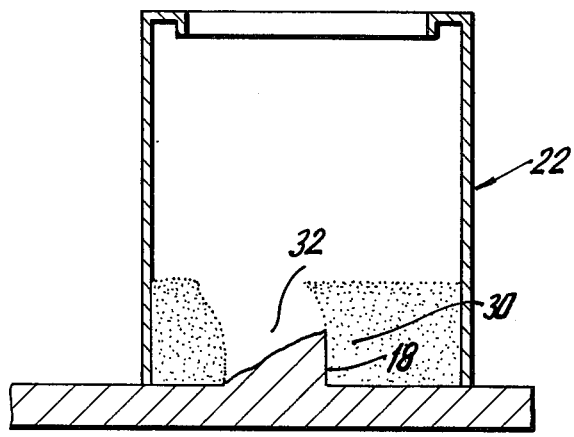

The refractory material, hereinafter referred to as molding sand, should be packed as uniformly, firmly and tightly as possible using a hand ram. Thereafter, as shown in FIG. 6, a portion of the sand 30 is removed so as to produce a member or lug casting space 32 (shown in FIG. 6) which corresponds to that portion of the lug member which is to be replaced. This casting space is generally dug out by hand.

In an alternative procedure, and referring back to FIG. 4, a plaster mold or cast of the lug portion to be replaced can be prepared and placed upon stump 18. Thereafter, the sand may be packed into the welding chamber as shown in FIG. 5. However, in this case, the portion shown by dotted line 20 would be taken up by the plaster mold. Thereafter, it would simply be necessary only to lift the portion of the plaster mold from the sand thereby creating casting space 32 without the necessity of having to form casting space 32 by hand.

In either case, the result is the same in that a casting space 32 corresponding to the shape of the portion of the lug to be replaced is created.

Figure 7:
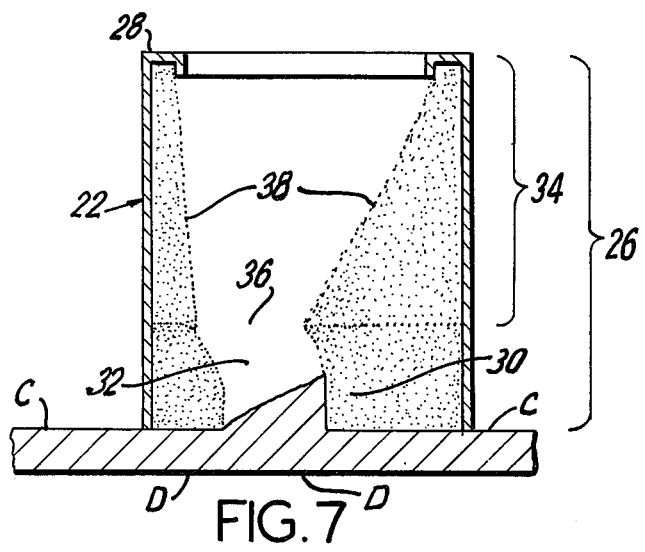

Thereafter, and referring to FIG. 7, a casting material feeding chamber is erected above casting space 32 which is designated 34. This is constructed by packing additional sand on top of the base provided by sand 30 upwardly along the walls of the casting chamber 26 and in a manner so as to create a funnel-like shape having a lower opening 36 which corresponds to and is in register with the top area of the lug to be formed. The sand is packed in such a manner as shown by the number 38 to have an upwardly and outward slope so as to create essentially a funnel shape. The sand is packed all the way up side walls 22 and in and under the lip portion 28.

This lip thus serves the purpose of protecting the top of the welding chamber from crumbling, i.e., it secures the sand against the side of walls 22, and secondly prevents it from crumbling due to the heat or splash of molted steel and slag.

The slope 38 of the side walls of the casting material feed chamber 34 is not critical so long as the slope is downwardly and inwardly so as to provide a easy gravitational flow of the welding material as discussed hereinafter into casting space 32.

After the formation of the welding chamber 26 which is composed of casting space 32 and welding material feed chamber 34, the sand used is dried. Inherently, such refractory meterial generally contains a certain amount of moisture and this should be removed prior to the final welding step in order to solidify or cement the sand forming the interior portion of the welding chamber. This is generally accomplished by heating the side of the ingot mold either at points C as shown in FIG. 7 or, if an ingot is not in the mold, from the inside of the mold at points D as shown in FIG. 7.

It is generally not desirable to heat the sides of walls 22, since the heat would be to intense and localized and cracks might form in the sand.

Generally, the amount of time necessary to heat an average setup is from about 1 – 1½ hours. During the last ½ hour of heating time, hand torches may be applied to the fractured face of the lug itself, i.e., the top of stump 18, so that it is heated to a cherry-red color.

Thereafter, after drying of the refractory material and appropriate heating of the stump of the lug, a conventional alumino thermic material is placed in welding chamber 26. Generally, such materials are composed of particulate aluminum and iron or steel oxide. In the present case, it is preferable to use a steel oxide as opposed to an iron oxide, since it produces a better weld.

Figure 8:
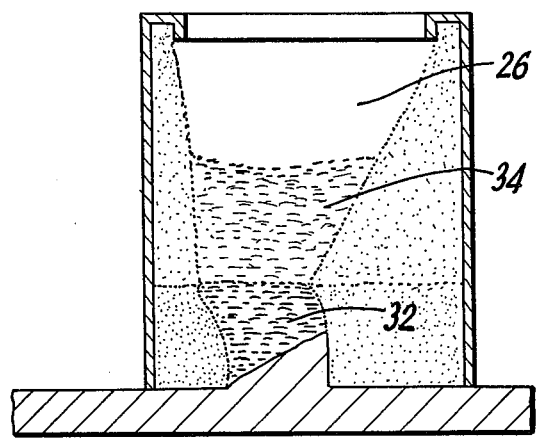

Referring to FIG. 8, casting space 32 and a portion of welding material feeding chamber 34 is filled with the alumino thermic material. The very top of the alumino thermic material is slightly dished in the center.

It is understood, of course, that the amount of alumino thermic material utilized is that amount which is calculated to produce the desired amount of weld metal to fill casting space 32. This will, of course, depend on the weld metal content of the alumino thermic material which varies from one commercial material to another.

In any event, after filling of the casting space 32 and the portion of welding material feed chamber 34 with the alumino thermic material, the alumino thermic material is ignited in a conventional manner utilizing the commercially available ignition powders.

Figure 9:
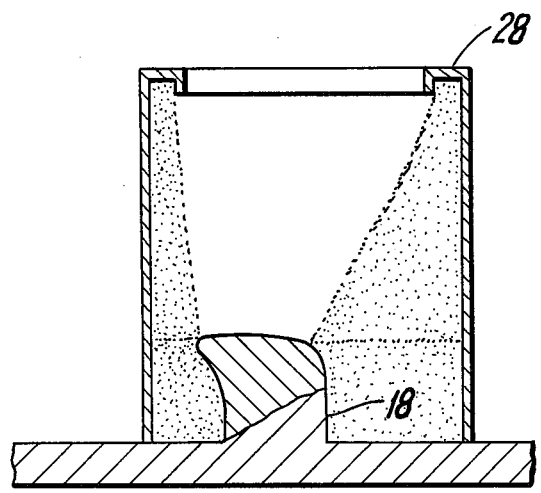

It burns, of course, with an extremely hot flame and the reaction generally lasts for about 2 –4 minutes. During that time, and referring to FIG. 8, the ignition of the alumino thermic material which begins at the very top produces weld metal which seeps down, through gravitation, onto and into casting space 32 and produces, upon completion of burning and cooling, a new lug portion member as shown in FIG. 9.

Figure 10:
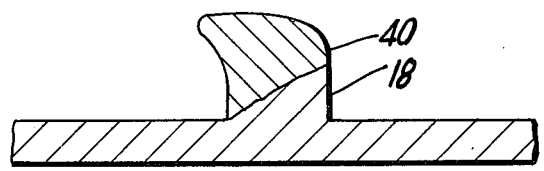

After cooling of the entire area, the casting chamber, including the side walls, sand, etc., may be removed thereby leaving a new lug 40 as shown in FIG. 10 which is securely mounted onto stump 18.

The following example illustrates the present invention.

A steel ingot mold having an inner size of 25 inches by 54 inches wherein the lug on the side had been completely torn away flush from the side of the mold was repaired as follows:

The mold was placed on its side with the side of the mold to be repaired in the uppermost position.

The lug to be replaced possessed a volume of 731 cubic inches and thus required a cast steel replacement of 731 cubic inches. Since the cast steel weighs 0.28 pounds per cubic inch, 204 pounds of cast steel was to be replaced.

Using an alumino thermic mixture providing a 45% yield based on weight of cast metal, the amount of alumino thermic material required was 2.22 times the weight of the metal to be replaced or 453 pounds.

The lug to be replaced had a width of 13 inches, a height of 12 inches and a total thickness of 5 inches, measuring from the side of the mold to the outermost surface of the lug. The diameter of the portion of the lug at the point of securement to the mold was 10 ½ inches.

A four sided box was prepared from steel plates, said box having a height of 15 inches and size of 30 inches each. It was placed on the uppermost side of the mold such that the area where the lug was to be secured, was centrally located within the walls of the box. The box was open on the top.

A layer of 5 inches of foundry sand was packed into the bottom of the box and then a portion of that sand was removed to create a casting space or cavity having the contours of the lug to be prepared.

Thereafter, additional foundry sand was packed along the inside wall of the steel box in an upwardly and outwardly sloping manner such as to create a funnel leading towards the casting cavity.

The sand was dried using a 3 inch air induced natural gas torch and thereafter the mold wall was heated from the inside directly under the lug replacement area until that portion of the mold wherein the lug was to be attached was cherry-red.

453 pounds of alumino thermic material was introduced into the casting space and filled up a portion of the welding chamber. Ignition powder was then placed in the center of the surface of the alumino thermic material and ignited. The ignition lasted for about 2 – 3 minutes.

After several hours, the steel box and the foundry sand were removed along with slag left from the reaction resulting in the production of a new lug having the dimensions of the original lug.

We claim:

1. A method for making and securing a lug or trunnion member to an ingot mold which comprises:

a. positioning the mold so that the area of the side of the ingot mold where the member is to be located, is substantially horizontal and uppermost;

b. forming a member casting space from a refractory material on the uppermost side of the ingot mold, said casting space having a size and shape corresponding to the shape of the member to be formed, and a bottom area of a size and shape corresponding to the base of the member where it is secured to the ingot mold and said bottom area being in registration with the base area of the side of the ingot mold where the member is to be secured, the upper most portion of the space being open and forming a top entrance to the casting space;

c. forming a casting material feeding chamber from refractory material, directly above and contiguous with the top entrance, said feeding chamber having a funnel shape, the smaller bottom opening being in registration and communicating with the entrance of the casting space entrance; the casting space and feeding chamber forming a single welding chamber closed on all sides except the top;

d. filling the welding chamber with an alumino thermic material in an amount effective to provide sufficient weld metal for forming the member; and e. igniting said alumino thermic mixture; whereby molten metal is formed from the alumino thermic reaction, and feeds downwardly by gravitation through said feeding chamber and into the casting space to form, on cooling, the member.

2. The method of claim 1, wherein the refractory material is selected from the group consisting of ramming compounds and foundry sand.

3. The method of claim 1 wherein the welding chamber is formed by:

f. erecting an upstanding wall on the uppermost side of the ingot mold surrounding and spaced apart from the base area;

g. filling the bottom portion of the walled area with a base layer of refractory material to the height of the member to be formed;

h. forming the member casting space in the base layer of refractory material; and i. forming the feeding chamber by packing additional refractory material against the inner side of the upstanding wall beginning from the top of said base layer to the top of said wall, the packing decreasing in thickness with increasing height to produce said funnel shape.

4. The method of claim 3, wherein prior to filling step (g), a mold having a shape corresponding to the desired shape of the casting space is placed in register with the base area, and after filling step (g), said mold is removed to form the casting space.

5. The method of claim 3 wherein the casting space is formed by removing portions of the refractory material from the bottom portion of the welding chamber to form a cavity having a shape corresponding to the desired shape of the casting space.

6. The method of claim 3 wherein the upstanding wall is made from a plurality of steel plates.

7. The method of claim 4 wherein the steel plates are secured to one another by tack welding.

8. The method of claim 3 wherein the top of the wall terminates in an inwardly and downwardly pointing lip to secure the top edge of said funnel formed from the refractory material.

* * * * *